United States Patent

Ueda et al.

[11] Patent Number: 6,098,083
[45] Date of Patent: Aug. 1, 2000

[54] WORD-PROCESSING SYSTEM FOR DISPLAYING PRIMARY AND SECONDARY LANGUAGE CHARACTERS USING A CGRAM AND A CGROM

[75] Inventors: Hiroyuki Ueda, Irvine; Ronald C. Whites, Costa Mesa; Dan M. Baer, Santa Ana, all of Calif.

[73] Assignee: Canon Business Machines, Inc., Costa Mesa, Calif.

[21] Appl. No.: 08/661,167

[22] Filed: Jun. 10, 1996

[51] Int. Cl.[7] .................................................. G06F 17/21
[52] U.S. Cl. .......................................... 707/503; 707/542
[58] Field of Search ...................................... 707/503, 536, 707/532, 535, 531, 542; 345/471, 343, 340, 346

[56] References Cited

U.S. PATENT DOCUMENTS

| | | | |
|---|---|---|---|
| 4,468,754 | 8/1984 | Asada et al. | 364/900 |
| 4,469,455 | 9/1984 | Makita | 400/171 |
| 4,627,748 | 12/1986 | Mizuno et al. | 400/17 |
| 4,710,130 | 12/1987 | Aarons | 434/157 |
| 4,774,666 | 9/1988 | Miyao et al. | 364/419 |
| 4,805,132 | 2/1989 | Okamoto et al. | 364/900 |
| 4,840,499 | 6/1989 | Sasaki | 400/83 |
| 4,870,402 | 9/1989 | DeLuca et al. | 340/825 |
| 4,954,979 | 9/1990 | Eibner et al. | 707/542 |
| 4,955,735 | 9/1990 | Sakuragi | 400/83 |
| 5,091,876 | 2/1992 | Kumano et al. | 364/419 |
| 5,127,748 | 7/1992 | Okimoto et al. | 707/536 |
| 5,251,130 | 10/1993 | Andrews et al. | 364/419 |
| 5,251,293 | 10/1993 | Ishii et al. | 345/471 |
| 5,257,187 | 10/1993 | Suzuki et al. | 704/3 |
| 5,276,796 | 1/1994 | Yamada et al. | 345/343 |
| 5,504,848 | 4/1996 | Yamada et al. | 707/503 |
| 5,535,119 | 7/1996 | Ito et al. | 704/3 |

OTHER PUBLICATIONS

T7889A (Dot Matrix LCD Controller/Driver) (Toshiba Jan. 1, 1989) pp. 174–193.
"Toshiba 1989 LCD Driver/Controller LSI Data Book", pp. 174–193.

Primary Examiner—James P. Trammell
Assistant Examiner—John Leonard Young
Attorney, Agent, or Firm—Fitzpatrick, Cella, Harper & Scinto

[57] ABSTRACT

A word-processing system selectably operable with a primary character set or at least one secondary character set. The system includes an input device for inputting a character, a selection device for selecting one of the primary character set and the secondary character set, a processor for generating secondary character graphics data corresponding to the character input by the input device in the case that the secondary character set is selected, a CGROM which stores character graphics data for the primary character set, and a CGRAM which stores the secondary character graphics data generated by the processor in the case where a secondary character set is selected, the CGRAM having a memory capacity which is less than that of the CGROM.

21 Claims, 11 Drawing Sheets

WORD-PROCESSING SYSTEM FOR DISPLAYING PRIMARY AND SECONDARY LANGUAGE CHARACTERS USING A CGRAM AND A CGROM

BACKGROUND OF THE INVENTION

1. Field of the Invention

The present invention relates to a word-processing system which displays an input character sequence. More particularly, a word-processing system according to the present invention displays characters printed by an interchangeable daisy wheel transfer device.

2. Description of the Related Art

Word-processing systems which employ daisy wheel transfer devices often support multiple character sets. Multiple character sets are supported by using overlays, which redesignate the keyboard in accordance with a selected character set, and multiple daisy wheels, each of which is capable of printing a different character set. Many of these word-processing systems also display typed characters before or during printing. However, these systems can only display characters of a primary character set. In other words, if typed characters are not found in the system's primary character set, the system cannot display the typed characters. Therefore, although these systems support the typing and printing of multiple character sets, they do not support the display of multiple character sets.

Therefore, what is needed is a word-processing system employing a replaceable daisy wheel transfer device which supports the display of multiple character sets.

SUMMARY OF THE INVENTION

The present invention addresses the foregoing situation by providing a word-processing system which is capable of displaying typed characters of any character set.

Thus, according to one aspect of the invention, a word-processing apparatus selectably operable with a primary character set or at least one secondary character set includes a keyboard for inputting a character and for selecting one of the primary character set and the secondary character set and a processor for generating secondary character graphics data corresponding to the character input by said input means in the case that the secondary character set is selected. This aspect of the invention also includes a CGROM which stores character graphics data for the primary character set and a CGRAM which stores the character graphics data generated by the processor in correspondence to the secondary character set in a case where the secondary character set is selected, the CGRAM having a memory capacity which is less than that of the CGROM. The processor also generates a display instruction which indicates that character graphics data for the primary character set is to be displayed when the primary character set has been selected and which indicates that character graphics data generated by the processor in correspondence to the secondary character set is to be displayed when the secondary character set had been selected. In accordance with the display instruction, a display controller coupled to the CGROM and CGRAM outputs the character graphics data stored in the CGRAM or the character graphics data stored in the CGROM that corresponds to the input character.

These and other features and advantages of the present invention will be more readily understood by reference to the following detailed description of preferred embodiments taken in conjunction with the attached drawings.

DETAILED DESCRIPTION OF THE PREFERRED EMBODIMENTS

Figure 1:
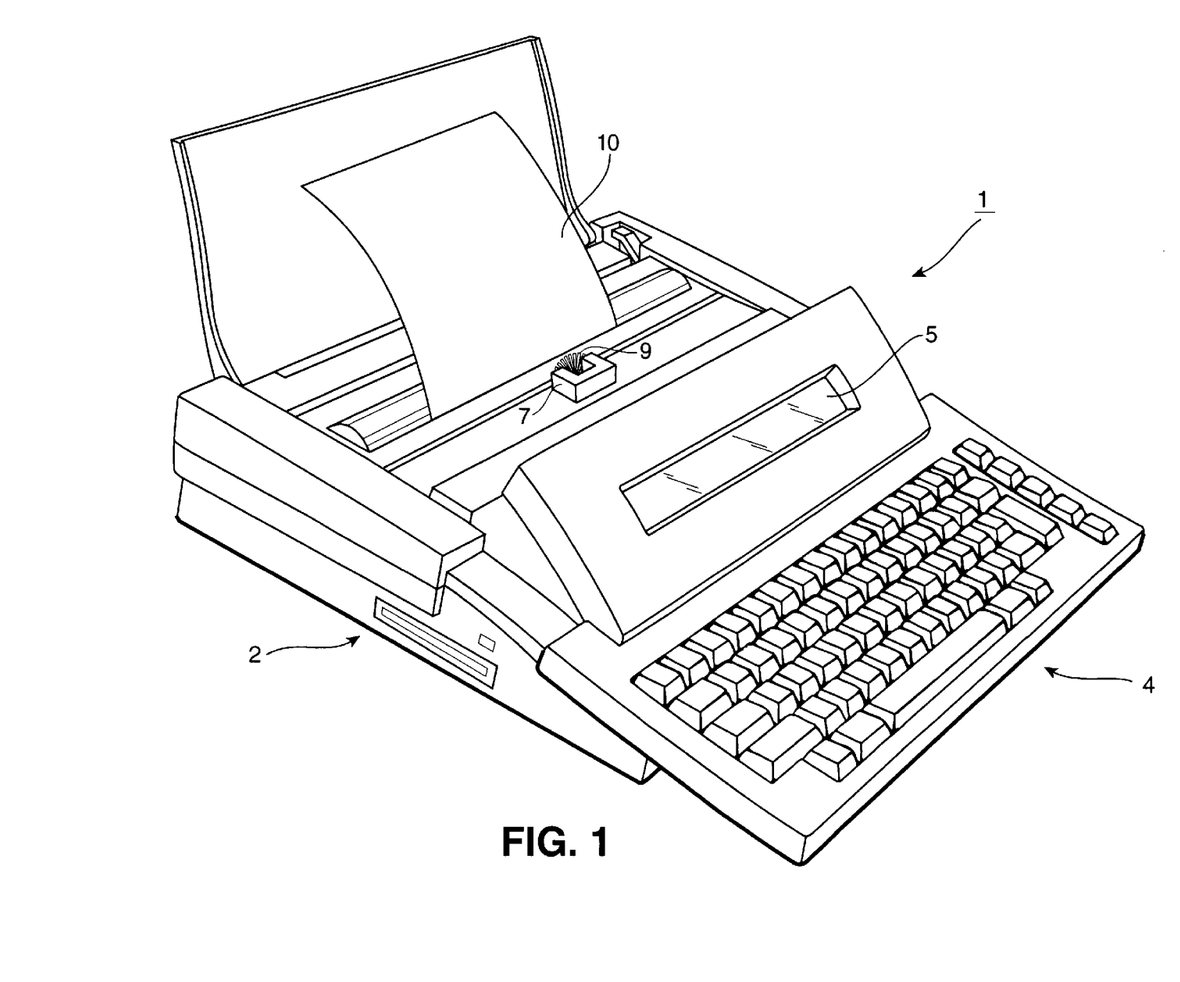
FIG. 1 is a perspective view of an electronic typewriter embodying the present invention.

As seen in FIG. 1, the present invention is embodied in an electronic typewriter 1. The electronic typewriter 1 can comprise, for example, Canon Model QS700 or Canon Model UT150. However, it should be understood that the present invention can be applied to any apparatus in which it is desirable to display character graphics data of multiple character sets.

The electronic typewriter 1 comprises a frame 2, a keyboard 4, a display screen 5 comprising a liquid-crystal display for displaying typed characters and other messages or icons, and a printing unit 7 containing a replaceable "daisy wheel" transfer device 9 for printing characters upon a page 10.

Figure 2:
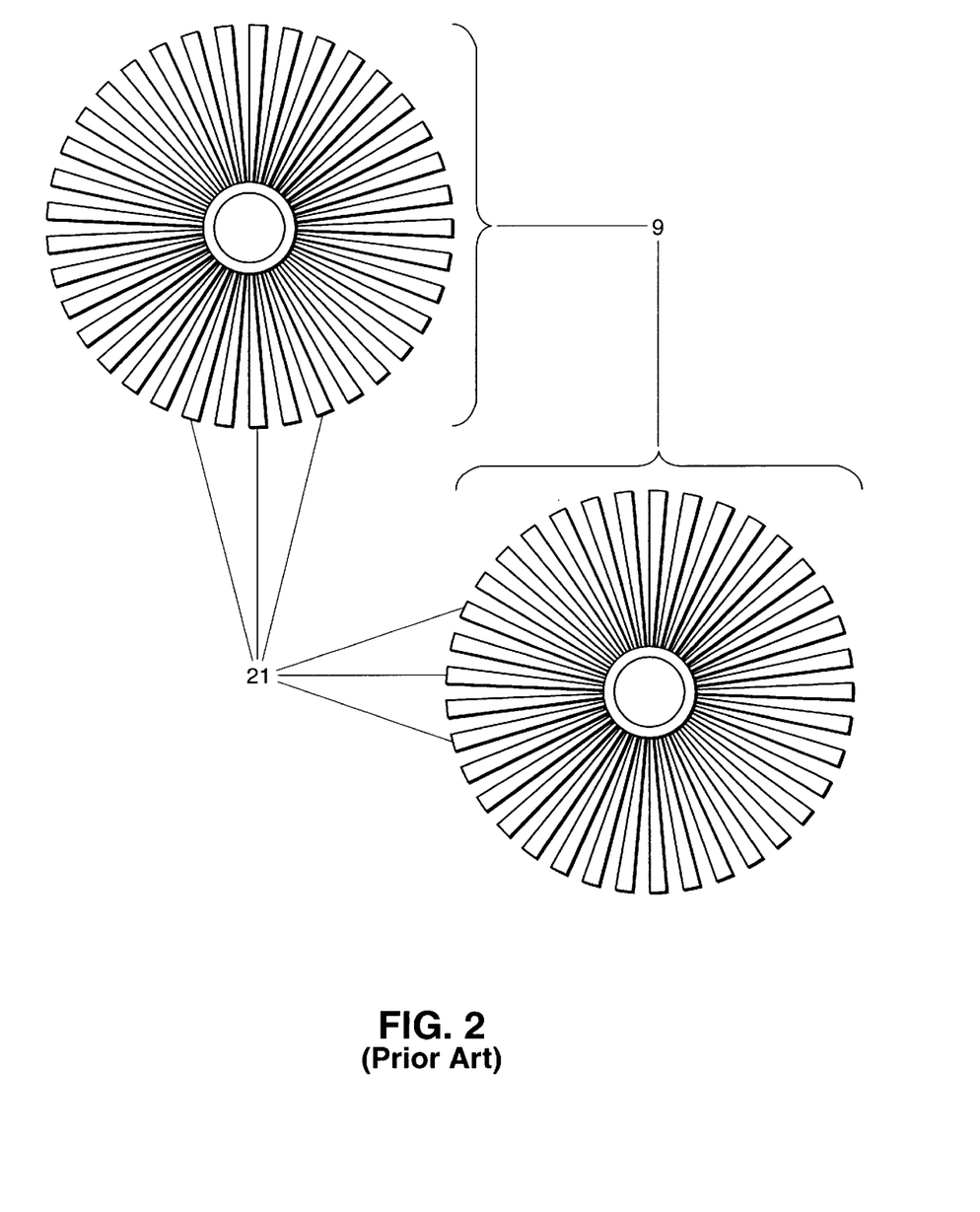
FIG. 2 is a perspective view of interchangeable daisy wheels used to create multiple-language hardcopy output in one embodiment of the invention.

FIG. 2 is a perspective view of two daisy wheel devices 9, which are well known in the art. In the present invention, each daisy wheel device 9 contains a character set corresponding to a primary or a secondary language. The daisy wheel device 9 which contains the character set corresponding to a language selected by a user is placed in the printing unit 7 before printing. Although the daisy wheel device 9 is mentioned in this description, it should also be understood that a dot-matrix printer, inkjet printer, or the like can be used for printing multiple character sets upon a page 10 while still keeping within the spirit of the invention.

Figure 3:
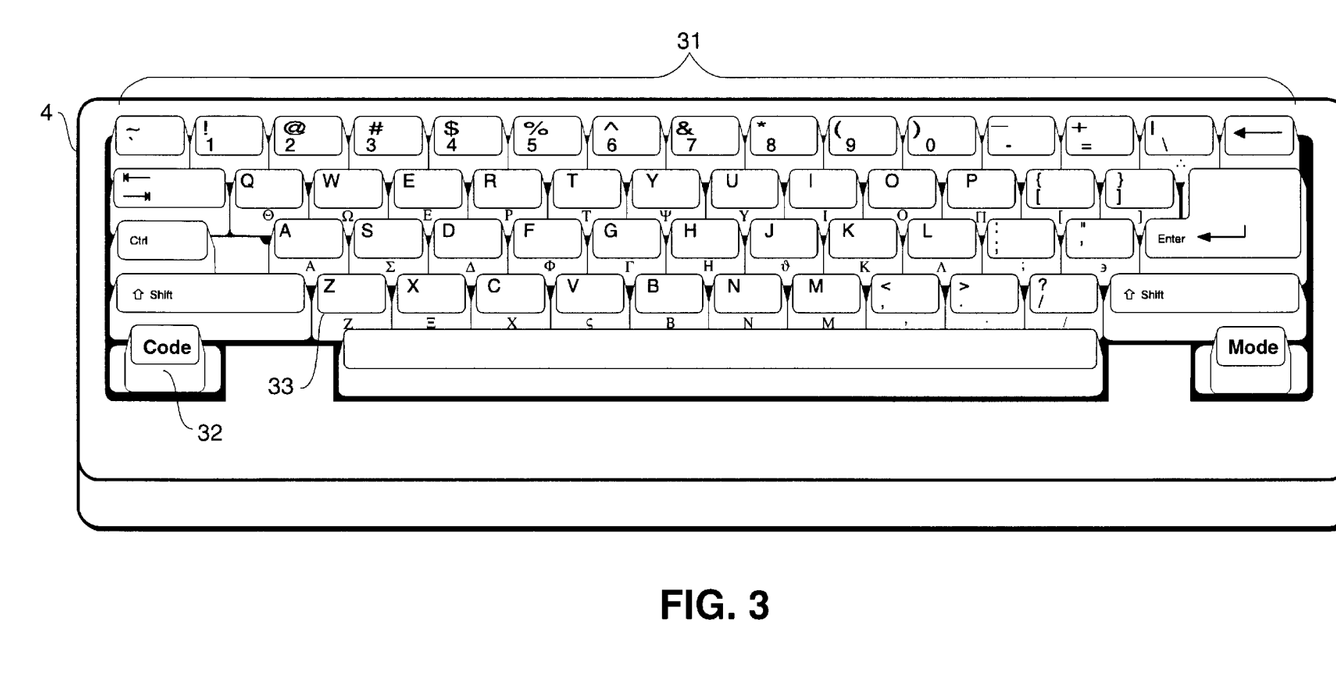
FIG. 3 is a perspective view of a keyboard used to input characters and select character sets in one embodiment of the present invention.

The keyboard 4, shown in detail in FIG. 3, is a typical alphanumeric keyboard in which a plurality of alphanumeric keys 31 are used for inputting characters of a plurality of character sets. The top surface of each of the keys 31 is marked in accordance with a primary character set. Also, as shown in FIG. 3, a secondary character set character (secondary character) is displayed on the exposed forward side of the key which is used to input the secondary character.

In another embodiment of the present invention, the keyboard 4 has keys 31 exclusively used to input secondary characters. In yet another embodiment, the keyboard 4 is overlaid with a template in order to replace the primary character set key designations with those of a secondary character set. Alternatively, characters may be input by a voice-recognition or a handwriting-recognition device.

The keyboard 4 is also used to select either the primary character set or the secondary character set. The character set is selected by execution of a Language Select key sequence, such as CODE+Z. Character set selection is described in further detail below.

Figure 4:
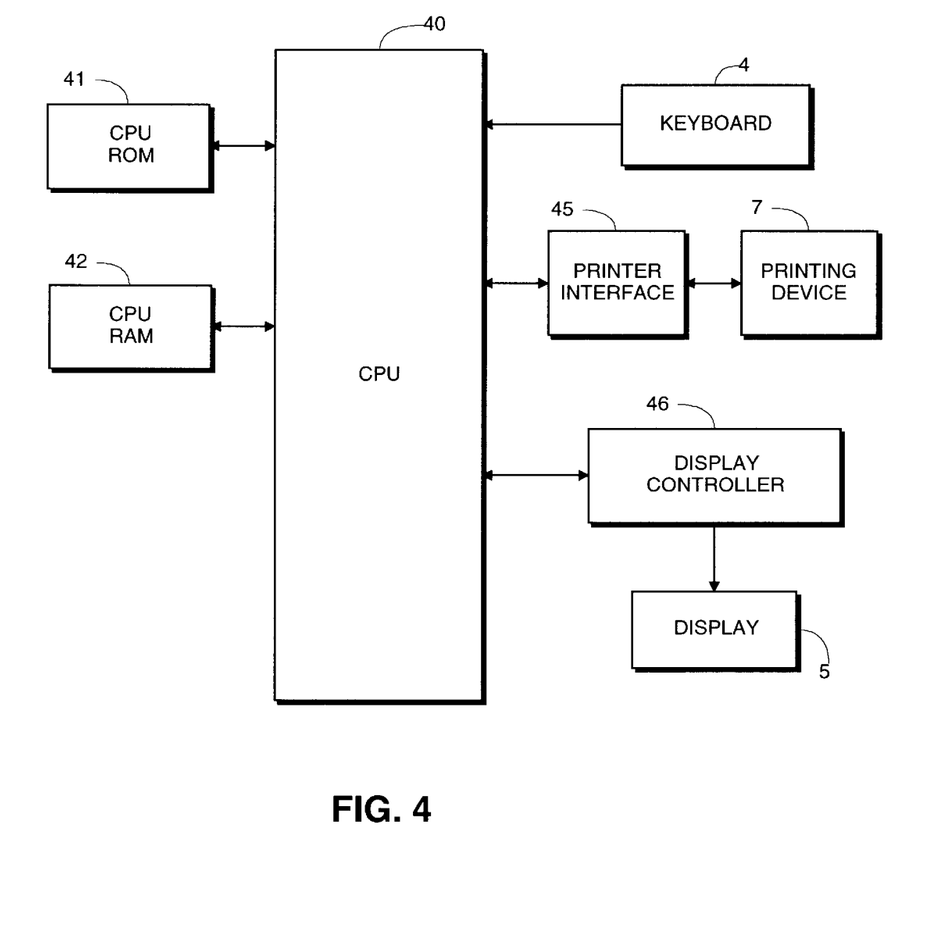
FIG. 4 is a schematic block diagram of a control system used in one embodiment of the present invention.

FIG. 4 is a detailed block diagram showing the internal control and processing components of the electronic typewriter 1. As shown in FIG. 4, the electronic typewriter 1 includes a central processing unit (CPU) 40 interfaced with a CPU ROM 41, a CPU RAM 42, a keyboard 4, a printer interface 45, and a display controller 46.

The CPU ROM 41 contains stored process steps which enable the electronic typewriter 1 to perform various functions. These process steps are retrieved by the CPU 40 based on user action upon the alphanumeric keys 31 of the keyboard 4. The CPU ROM 41 may be a cartridge, tape or other similar read-only memory storage device. Note that the CPU ROM 41 also stores secondary character graphics data.

In the case where the keyboard 4 detects a key operation, a code corresponding to the key operation is input to the CPU 40. The code is either collected as typed text to the CPU RAM 42 or is processed as an operator command. For example, upon execution of the Language Select key, the CPU 40 recognizes the input code as an operator command and executes the command instead of transferring the code to the CPU RAM 42. Further details of the internal processes initiated by the Language Select key sequence will be described below.

With respect to the printer interface 45, the CPU 40 initiates a printing action based on input from the keyboard 4. The CPU 40 sends signals to the printer interface 45 which drives the printing unit 7. Furthermore, the CPU 40 sends signals to the display controller 46, which contains CGRAM and CGROM for outputting character graphics data to the display 5.

It should be understood that the signals sent to the printer interface 45 and to the display controller 46 upon pressing a specific key 31 do not change when a new character set is used. For example, in one embodiment, if the key 31 representing the letter "a" is depressed, the number five is sent to the printer interface 45 and the number thirty is sent to the display controller 46. Accordingly, the letter "a" is located at reference point five of a daisy wheel 9 and is the thirtieth letter in a CGROM lookup table. If a new character set is used, the "a" key is redesignated as a new character and the new character is located at the thirtieth position in the new character set's lookup table and at reference point five of the daisy wheel 9. As a result, multiple character sets are supported merely by replacing the daisy wheel 9 and redesignating the keyboard keys 31.

Figure 5:
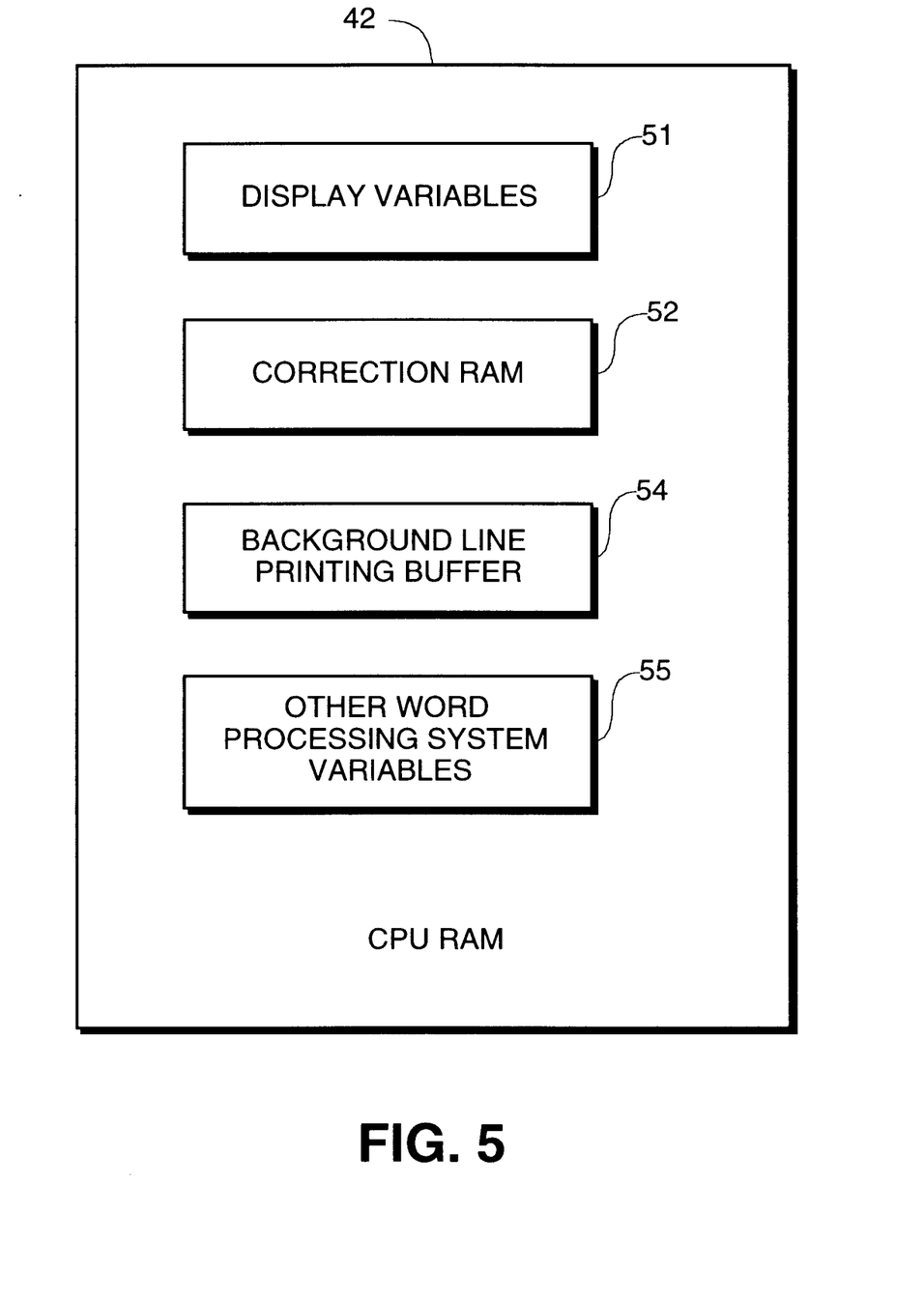
FIG. 5 is a block diagram showing a memory map of the CPU RAM.

As shown in FIG. 5, the CPU RAM 42 contains miscellaneous variables and data storage areas for stack pointers, etc. The display variable memory area 51 contains variables used for display handling including a maximum display width used variable (MDWU), a current display column location variable (CDCL) and a selected language flag. The correction RAM area 52 contains character storage memory for correcting and editing typed text and the background printing line buffer area 54 contains memory for storing the background printing line. Finally, other word processing system variables are located in another RAM memory area 55.

Figure 6:
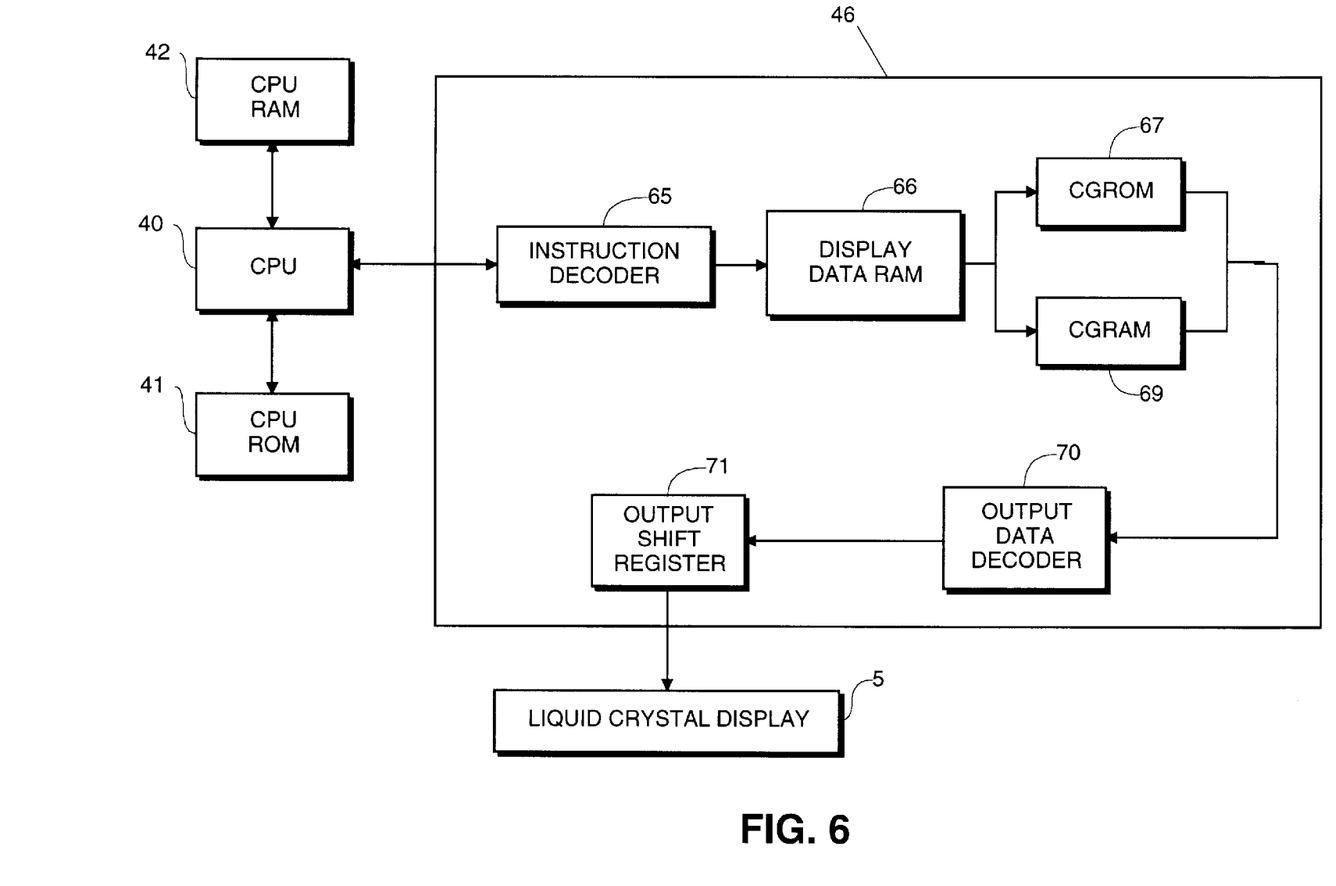
FIG. 6 is a detailed block diagram of a display controller used in one embodiment of the present invention.

FIG. 6 is a detailed block diagram of the display controller of the present invention. The CPU 40 initiates a display function by sending a display instruction to the display controller 46. Instruction decoder 65 decodes the display instruction and sends a signal to the CPU 40 indicating the status of the display controller 46. In accordance with the status signal, the CPU 40 outputs key code data and display column address data to the display controller 46.

The display data RAM 66 contains address locations corresponding to each display column 75 of the liquid crystal display 5. Information corresponding to a character displayed in a display column 75 is stored at the display column's corresponding display data RAM address location. In the case that a primary character graphics data is displayed, the key code corresponding to that character is located in the display data RAM at the address location corresponding to that character's display column 75. In the case that a secondary character graphics data is displayed, the CGRAM address at which the secondary character graphics data is located is stored in the display data RAM address location corresponding to that character's display column.

The CGRAM addresses, as well as the key codes, consist of one byte each, wherein the upper four bits of the CGRAM address locations are set to zero (codes 0–15 decimal) while the key codes corresponding to primary character graphics data do not have their upper four bits set to 0 (codes 16–255 decimal). The CGRAM, therefore, has sixteen address locations. For reasons described below, fifteen of the locations are used for storing secondary character graphics data and the sixteenth is used to store the character graphics data for a "filled space" character.

Character graphics data from the CGROM 67 or the CGRAM 69 is sent through the output data decoder 70 and the output shift register 71 to the liquid crystal display 5. A process step stored in the CPU ROM 41 directs the CPU 40 to command the display controller 46 to display the character graphics data. As described below, the process steps stored in the CPU ROM 41 limit the width of the display 5 which can be used for displaying secondary character graphics data.

The functioning of the display controller will be described in more detail with respect to FIGS. 10 and 11.

Figure 7:
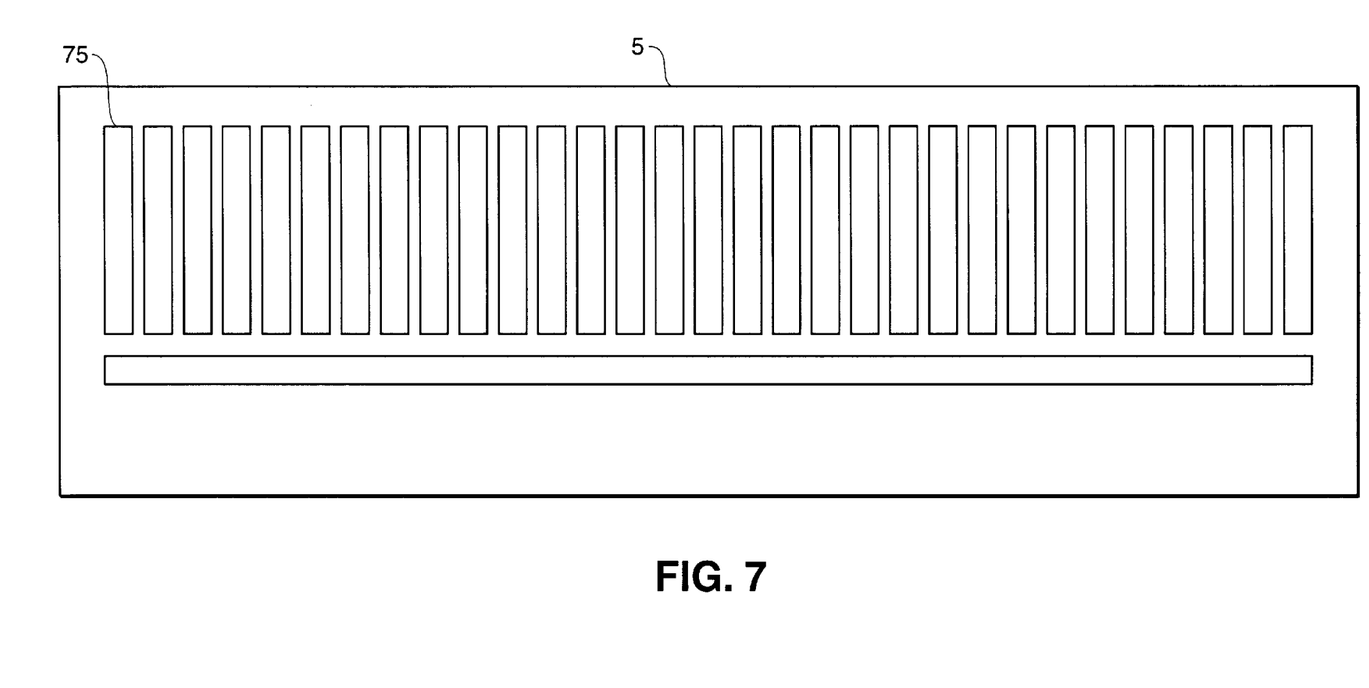
FIG. 7 is a perspective view of a cleared display in the case where a primary character set is selected.

FIG. 7 is a perspective view of the liquid crystal display 5. The display 5 consists of thirty-one display columns 75 which are available for character graphics data display. Each display column 75 consists of a matrix of five dots by eleven dots and three horizontal display lines. The display 5 in FIG. 7 demonstrates the appearance of a cleared display in the case where the primary character set is selected.

Figure 8A:
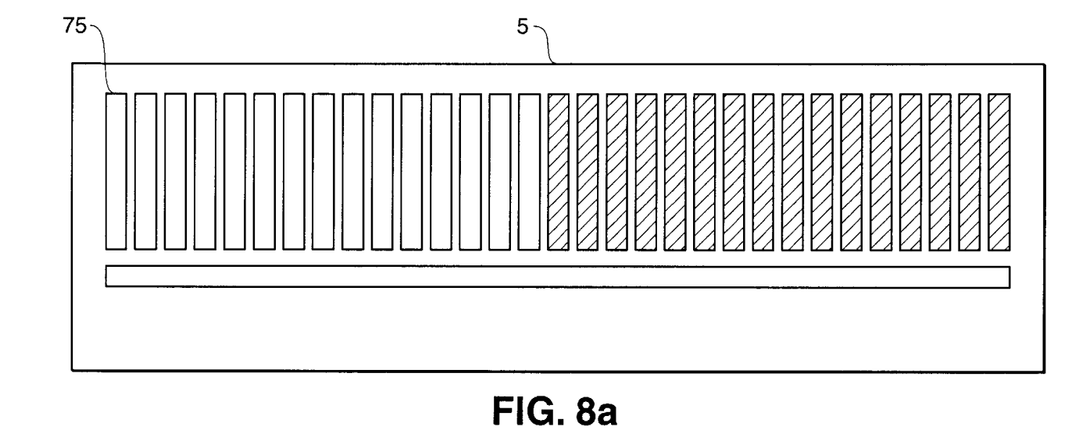
FIG. 8A is a perspective view of a cleared display in the case where a secondary character set is selected according to a first embodiment of the present invention.
Figure 8B:
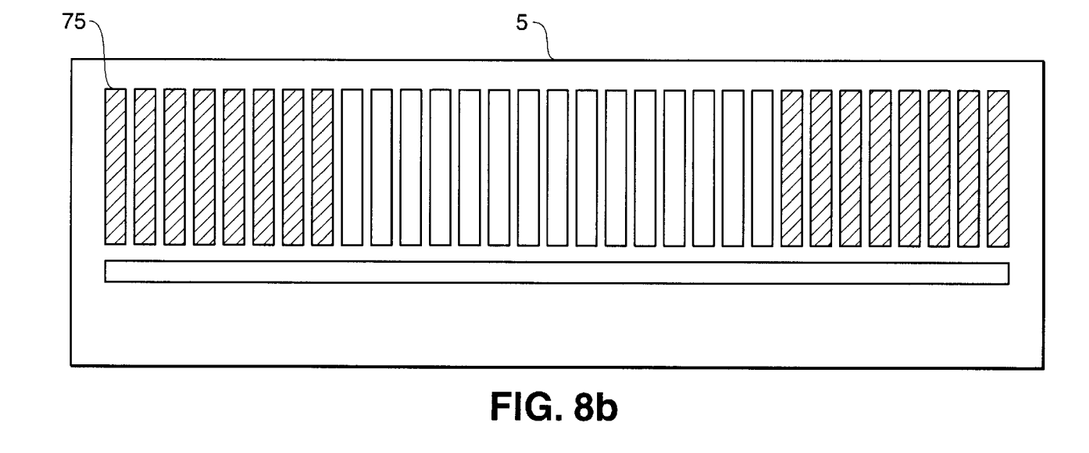
FIG. 8B is a perspective view of a cleared display in the case where a secondary character set is selected according to a second embodiment of the present invention.

In contrast, FIGS. 8a and 8b are perspective views of a cleared liquid crystal display 5 in the case where the secondary character set is selected. In FIG. 8a, display columns 75 one through fifteen display a "clear space" character, while display columns 75 sixteen through thirty-one display a "filled space" character. In another embodiment, shown in FIG. 8b, display columns 75 one through eight and twenty-five through thirty-two display a filled space character, while the center group of display columns 75 nine through twenty-four display a clear space character. Clearing the liquid crystal display 5 in accordance with the selected character set will be discussed in more detail with respect to FIGS. 10 and 11.

Figure 9:
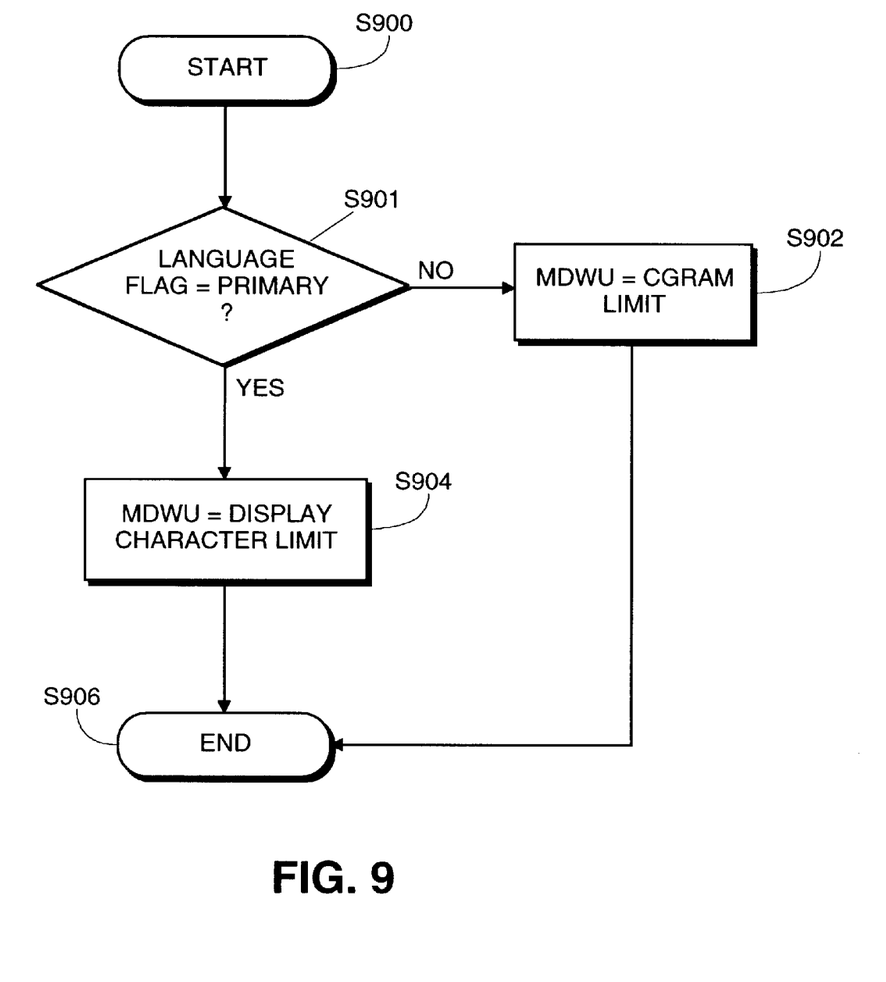
FIG. 9 is a flowchart illustrating a method of initializing the available display width according to one aspect of the present invention.

FIG. 9 is a flow chart illustrating the initialization of the MDWU variable in accordance with the selected character set. Step S900 occurs either at power-on initialization or when the selected character set is changed. In step S901, the language flag located in the display variables memory area 51 of the CPU RAM memory map 42 is tested to determine whether the primary character set or the secondary character set is selected. In the present embodiment, if the language flag byte is set to zero, the primary character set is selected, the corresponding language being English. In the case that the language flag byte is set to 1, the secondary character set is selected, corresponding to the Bengali language. Of course, any combination of languages and language designating codes can be used in practicing this aspect of the invention.

If the language flag is set to 1, flow proceeds to step S902, where the MDWU byte located in the display variables memory area 51 of the CPU RAM memory map 42 is set equal to the CGRAM character display limit. As stated above, the CGRAM 69 can contain character graphics data for fifteen secondary characters and a filled space character. Accordingly, the CGRAM character display limit is fifteen. If, in step S901, the language flag is set to zero, indicating that the primary character set is selected, flow proceeds to step S904.

In step S904 the MDWU byte is set to thirty-two, corresponding to the number of display columns 75 in the display 5 used in the present embodiment. It should be understood that the foregoing MDWU values are dependent upon the size of the CGRAM 69 and the display capability of the liquid crystal display 5, respectively. Once the MDWU value is set, flow continues to step S906, where the process terminates.

Figure 10:
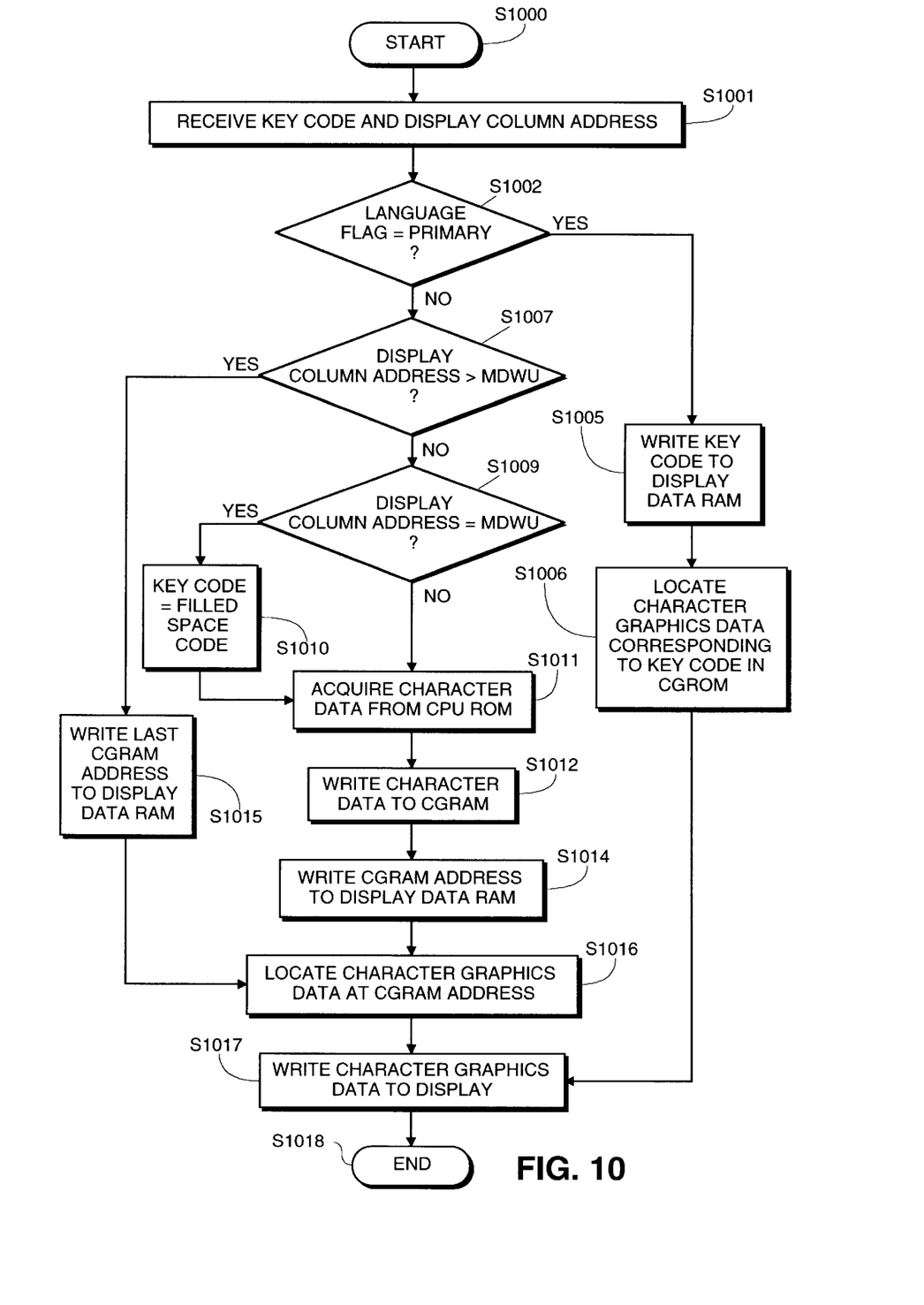
FIG. 10 is a flowchart illustrating a method for displaying character data according to the present invention.

FIG. 10 is a flowchart describing the process of displaying character graphics data according to the present invention. The process begins at step S1000. In step S1001, a key code and a display column address are received from the CPU 40 by the instruction decoder 65, either after being called by the display clearing routine of FIG. 11, described in detail below, or in response to a user input. The key code corresponds to the character to be displayed and the display column address indicates the display column 75 in which the character is to be displayed. In step S1002, the language flag is examined to determine whether the primary character set is selected. If not, steps S1007 through S1018 are executed, as described below in reference to FIG. 11. If so, flow proceeds to step S1005, in which the key code is written to the display data RAM 66.

As described above, each address of the display data RAM 66 corresponds to a display column 75 in the liquid crystal display 5. Therefore, in step S1005, the key code is written to the address of the display data RAM 66 which corresponds to the display column 75 indicated by the display column address received in step S1001. In step S1006, the display data RAM 66 sends the key code to the CGROM 67 in order to obtain the proper primary character graphics data.

If the upper four bits of the key code are not each set to zero, the corresponding character graphics data is located in the CGROM 67. Therefore, the display data RAM 66 sends the information located in each of its address locations to either the CGROM 67 or the CGRAM 68 according to the state of the upper four bits of the information. Accordingly, in step S1006, the key code is sent to the CGROM 67 because the primary character set is selected and the CPU 40 assigns key codes to primary characters such that the upper four bits of the key codes are not set to zero.

In step S1017, the character graphics data corresponding to the key code is sent from the CGROM 67 to the output data decoder 70, the output shift register 71 and to the liquid crystal display 5, where it is displayed. The character graphics data is displayed in the display column 75 corresponding to the display data RAM address to which the key code was written in step S1005.

Figure 11:
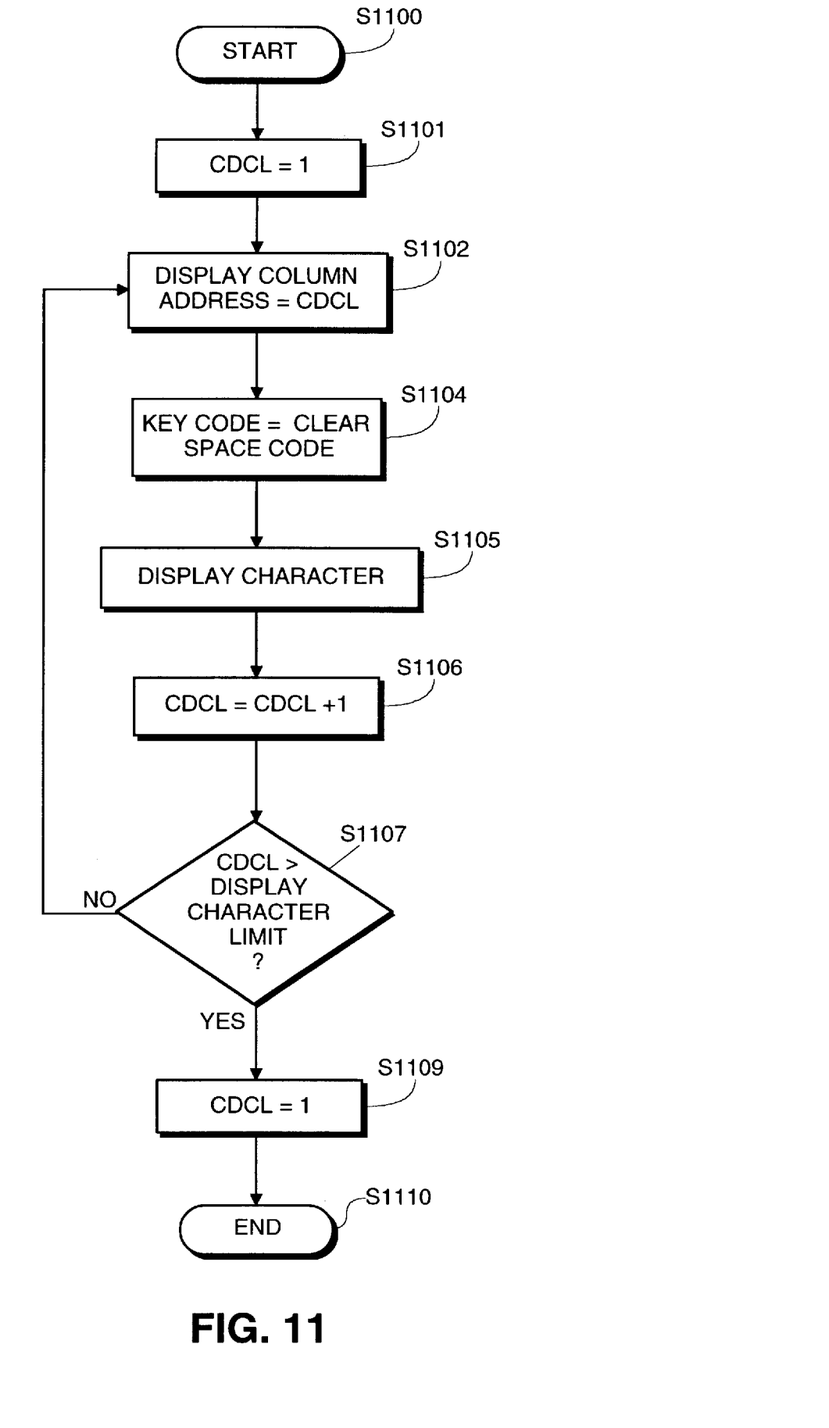
FIG. 11 is a flowchart illustrating a method for clearing a display according to the present invention.

The flowchart of FIG. 11 describes the process used to clear the liquid crystal display 5. Step S1100 is executed upon system power-on, system reset initialization, character set switching, or when creating a new text line. In step S1101, the CDCL variable held in the display variable memory area 51 of the CPU RAM 42 is set equal to one. This variable designates the display column 75 in which character graphics data will be displayed. Accordingly, in step S1102, the display column address variable is set equal to the CDCL. Flow proceeds to step S1104, in which the CPU 40 generates a key code corresponding to a "clear space" character. Flow then continues to step S1000 of FIG. 10.

In the case that the primary character set is selected, flow proceeds from step S1000 through step S1018 as described above, thereby displaying a clear space character in the display column 75 indicated by the CDCL. In the case that the secondary character set is selected, flow proceeds as follows.

First, in step S1001, the key code and the display column address defined in steps S1102 and S1104 are received from the CPU 40 by the instruction decoder 65. Again, the key code corresponds to an input character, and the display column address indicates the display column 75 in which the input character is to be displayed. Flow then proceeds through step S1002 to step S1007, in which the display column address is compared with the MDWU variable. If the display column address does not exceed the MDWU variable, flow proceeds to step S1009, where the display column address is again compared with the MDWU variable. If the MDWU variable is not equal to the display column address, flow continues to step S1011.

It should be understood that steps S1011 through S1018 occur each time any secondary character graphics data is displayed. The steps are described here in reference to the display clearing routine in order to provide an example of the process of displaying secondary characters. In step S1011, the clear space character graphics data corresponding to the received key code is acquired from the CPU ROM 41. This key code must identify the clear space character graphics data located in both the CPU ROM 41 and the CGROM 67 because this key code is used by the display clearing routine of FIG. 10 regardless of whether the primary character set or the secondary character set is selected. Of course, this correspondence is not required for other secondary character graphics data, which are not acquired from the CGROM 67.

As stated above, the CGRAM 69 contains addresses for fifteen secondary characters and a filled space character. Accordingly, as shown in FIG. 8a, the first fifteen display columns 75 are used to display secondary character set characters and the remaining display columns 75 display a filled space character. The first fifteen CGRAM addresses contain the secondary character graphics data to be displayed in the first fifteen display columns 75. Therefore, in step S1012, the clear space character graphics data is written to the CGRAM 69 at the CGRAM address corresponding to the display column 75 in which the character is to be displayed.

In step S1014, the CGRAM address to which the character graphics data was written in step S1012 is written to the display data RAM 66 address corresponding to the display column 75 in which the character is to be displayed. This CGRAM address is sent to the CGRAM 69 in step S1016 in order to acquire the character graphics data located at that address. The display data RAM 66 sends the address to the CGRAM 69 instead of the CGROM 69 because the upper four bits of the CGRAM address are set to zero, as described above.

In step S1017, the character graphics data acquired in step S1016 is sent from the CGRAM 69 to the output data decoder 70, the output shift register 71, and finally to the liquid crystal display 5, where it is displayed. The character graphics data is displayed in the display column 75 corresponding to the display data RAM address to which the CGRAM address was written in step S1014. Flow then returns to step S1106.

In step S1106, the CDCL variable is incremented by one. If, in step S1107, the CDCL variable is less than or equal to the number of characters which can be displayed on the display 5, flow proceeds to steps S1102, S1104, and S1105, as described above. This process continues until, in step S1009, the display column address is determined to be equal to the MDWU variable. Once this determination is made, flow proceeds to step S1010, in which the key code, which corresponds to a clear space character graphics data, is changed to a key code which represents a filled space character. This filled space character graphics data is displayed in the display columns 75 which are not used for secondary character graphics data display, as shown in FIG. 8a.

At this point of the display clearing routine, the display column address variable equals fifteen. Consequently, flow proceeds as described above, with the filled space character graphics data being acquired from the CPU ROM 41 and written to the CGRAM 69 at address fifteen, which is the sixteenth and last address position in the CGRAM 69. In step S1014, the CGRAM address, fifteen, is written to the display data RAM 66 address corresponding to the sixteenth display column 75. The CGRAM address is then sent to the CGRAM 69 in step S1016 in order to retrieve the character graphics data for the filled space character, located at address fifteen of the CGRAM 69. As above, the character graphics data is then sent from the CGRAM 69 to the output data decoder 70, the output shift register 71, and finally to the liquid crystal display 5, where it is displayed. Again, the character graphics data is displayed in the display column 75 corresponding to the display data RAM address to which CGRAM address was written in step S1014.

After displaying the filled space character graphics data in the fifteenth display column 75, flow then proceeds through steps S1106, S1107, S1102, S1104, S1105, S1000, S1001, S1002, and S1007, as described above. At step S1007, the display column address is greater than the MDWU variable, so flow proceeds to step S1015.

Address fifteen of the CGRAM 69 contains, at this point of the display clearing routine, character graphics data for the filled space character. In step S1015, since the display column address variable now equals seventeen, CGRAM address fifteen is written to the display data RAM 66 address corresponding to the seventeenth display column 75. Again, in step S1016, this CGRAM address is sent to the CGRAM 69. The filled space character graphics data found at CGRAM address fifteen is then sent from the CGRAM 69 to the output data decoder 70, the output shift register 71, and the liquid crystal display 5 for display in the seventeenth display column 75.

Steps S1106, S1107, S1102, S1104, S1105, S1000, S1001, S1002, S1007, S1015, S1016, S1017 and S1018 are repeated as described above until the CDCL variable is greater than the number of display columns 75 in the display 5. Because the CDCL variable is incremented in step S1106, CGRAM address fifteen is written to a display data RAM address corresponding to a new display column 75 each time these steps are repeated. As a result, once the flow reaches step S1109, the display 5 appears as shown in FIG. 8a. The display clearing routine terminates at step S1110.

While the present invention has been described with respect to what is currently considered the preferred embodiments, it is to understood that the invention is not limited to disclosed embodiments. To the contrary, the invention is intended to cover various modifications and equivalent arrangements within the spirit and scope of the appended claims.

What is claimed is:

1. A word-processing apparatus selectably operable with a primary character set or at least one secondary character set, comprising:

input means for inputting a character;

selecting means for selecting one of the primary character set and the secondary character set;

a processor for generating secondary character graphics data corresponding to the character input by said input means in the case that the secondary character set is selected;

a CGROM which exclusively stores character graphics data for the primary character set; and a CGRAM which exclusively stores the secondary character graphics data generated by said processor in the case that a secondary character set is selected, said CGRAM having a memory capacity which is less than that of said CGROM.

2. The apparatus of claim 1, wherein said processor also generates a display instruction which indicates that the character graphics data for the primary character set is to be displayed when the primary character set is selected and which indicates that the character graphics data generated by said processor is to be displayed when the secondary character set is selected.

3. The apparatus of claim 2, further comprising:

a display controller, coupled to said CGROM and to said CGRAM, for outputting, in accordance with the display instruction generated by said processor, the character graphics data stored in said CGRAM or the character graphics data stored in said CGROM that corresponds to the input character; and display means having a display surface for displaying output from said display controller.

4. The apparatus of claim 3, wherein said display surface further comprises a plurality of display columns, in one of which the output character graphics data stored in said CGRAM is displayed, and wherein an address at which the character graphics data stored in said CGRAM is proportionally related to an address of the one of said plurality of display columns in which the output character graphics data stored in said CGRAM is displayed.

5. The apparatus of claim 4, wherein said input means comprises a keyboard having a plurality of keys selectively mapped in a plurality of languages.

6. The apparatus of claim 4, wherein said input means comprises a voice-recognition device.

7. The apparatus of claim 4, wherein said input means comprises a handwriting recognition device.

8. The apparatus of claim 4, wherein said display means comprises a dot-matrix liquid crystal display arranged to display the output primary character graphics data on a full display surface of said liquid crystal display, and to display the output secondary character graphics data on less than the full display surface of said liquid crystal display.

9. The apparatus of claim 8, wherein the output character graphics data stored in said CGRAM is displayed in a furthermost left column of said plurality of display columns.

10. The apparatus of claim 8, wherein the output character graphics data stored in said CGRAM is displayed exclusively in a center group of the plurality of display columns.

11. A word-processing method comprising:

an input step for inputting a character;

a selecting step for selecting one of a primary character set stored exclusively in a CGROM and a secondary character set stored exclusively in a CGRAM;

a generating step for generating a secondary character graphics data corresponding to the input character in the case that the secondary character set is selected in said selecting step; and a storing step for storing the secondary character graphics data generated in said generating step exclusively in a CGRAM, said CGRAM having a memory capacity which is less than that of said CGROM.

12. The method of claim 11, further comprising a second generating step for generating a display instruction which indicates that the primary character graphics data is to be displayed when the primary character set has been selected in said selecting step and which indicates that the secondary character graphics data is to be displayed when the secondary character set is selected in said selecting step.

13. The method of claim 12, further comprising:

an output step for outputting, in accordance with the display instruction generated in said second generating step, one of the secondary character graphics data stored in said CGRAM and the primary character graphics data stored in said CGROM that correspond to the input character; and a display step for displaying the output from said outputting step.

14. The method of claim 13, wherein said display step comprises the step of displaying the output secondary character graphics data in one of a plurality of display columns, and wherein said storing step comprises the step of storing the secondary character graphics data generated in said first generating step at an address of said CGRAM which is proportionally related to an address of the one of said plurality of display columns in which the output secondary character graphics data is displayed.

15. The method of claim 14, wherein said input step comprises the step of detecting a user action on a keyboard having a plurality of keys selectively mapped in a plurality of languages.

16. The method of claim 14, wherein said input step comprises the step of inputting voice-recognition data.

17. The method of claim 14, wherein said input step comprises the step of inputting handwritten data.

18. The method of claim 14, wherein said display step comprises the step of displaying the output from said outputting step on a dot-matrix liquid crystal display arranged to display the output primary character graphics data on a full display surface of said display, and to display the output secondary character graphics data on less than the full display surface of said display.

19. The method of claim 18, wherein said display step further comprises the step of displaying the output secondary character graphics data in a furthermost left column of said plurality of display columns.

20. The method of claim 18, wherein said display step further comprises the step of displaying the secondary character graphics data exclusively in a center group of the plurality of display columns.

21. An electronic typewriter which includes an LCD display for displaying primary language characters on a full display surface thereof when a primary language mode is selected, and for displaying secondary language characters on less than the full display surface when a secondary language mode is selected, said electronic typewriter comprising:

a keyboard having character keys for inputting a character sequence, and a mode selection key for selecting one of a primary language mode and a secondary language mode, the primary language mode for displaying primary language characters corresponding to the input character sequence and the secondary language mode for displaying secondary language characters corresponding to the input character sequence;

a processor for processing the input character sequence, for generating secondary language characters corresponding to the input character sequence in the case that the secondary language mode is selected, and for generating a display instruction which indicates that primary language characters are to be displayed when the primary language mode has been selected and which indicates that the secondary language characters are to be displayed when the secondary language mode has been selected;

a CGROM exclusively for storing predetermined primary language characters;

a CGRAM exclusively for storing the secondary language characters generated by said processor in the case that the secondary language mode is selected, said CGRAM having a memory capacity which is less than that of said CGROM;

a display controller, coupled to said CGROM and to said CGRAM, for outputting, in accordance with the display instruction generated by said processor, one of the secondary language characters from said CGRAM and primary language characters from said CGROM that correspond to the input character sequence; and an LCD display having a display surface for displaying output from said display controller;

wherein said LCD display is arranged to display the primary language characters on a full display surface of said LCD display, and to display the secondary language characters on less than the full display surface of said LCD display.

* * * * *